United States Patent [19]
Hoffmeister et al.

[11] 3,941,259
[45] Mar. 2, 1976

[54] DEVICE FOR RELOCATING FUEL ELEMENTS AND CONTROL RODS IN A CORE REACTOR

[75] Inventors: Bernhard Hoffmeister; Wilhelm Schwarz, both of Wilhelmshaven, Germany

[73] Assignee: Fried. Krupp Gesellschaft mit beschrankter Haftung, Essen, Germany

[22] Filed: Dec. 26, 1974

[21] Appl. No.: 536,354

[30] Foreign Application Priority Data
Feb. 21, 1974 Germany............................ 2408261

[52] U.S. Cl. .............. 214/27; 137/355.25; 176/30; 212/129; 214/18 N
[51] Int. Cl.²........................................ B66C 19/00
[58] Field of Search .... 214/18 N, 27, 658, DIG. 11; 176/30; 137/355.25; 212/42.5, 125, 127, 128, 129

[56] References Cited
UNITED STATES PATENTS
3,612,318  10/1971  Ramsey..................... 137/355.25 X
3,768,668  10/1973  Schukel................................ 214/27

Primary Examiner—Robert G. Sheridan
Attorney, Agent, or Firm—Walter Becker

[57] ABSTRACT

A device for changing the location of fuel elements and control rods in a core reactor with a guiding mast which is mounted on a movable working platform for rotation about a vertical axis and which is provided with a gripping body for grasping the fuel elements and control rods, said gripping body being suspended on a lifting mechanism and being displaceable in vertical direction within the guiding mast while being prevented from rotating relative to the guiding mast. The device furthermore comprises winding means for storing supply lines which are introduced at the top into the guiding mast and the gripper body.

The device also includes power operated means for actuating the lifting mechanism. The winding means and lifting mechanism rotate with the mast and are so arranged in the mast that any water dripping therefrom runs down the inside of the mast. Supply conduits leading to the mast are connected thereby by slack loops which permit 360° of rotation of the mast.

11 Claims, 6 Drawing Figures

DEVICE FOR RELOCATING FUEL ELEMENTS AND CONTROL RODS IN A CORE REACTOR

The present invention relates to a device for changing the location of fuel elements and control rods in a core reactor with a guiding mast which is mounted on a movable working platform for rotation about a vertical axis. More specifically, the present invention relates to a device as just set forth, which is provided with a gripping body for grasping the fuel elements and control rods, said gripping body being suspended on a lifting mechanism and being displaceable in vertical direction within the guiding mast while being prevented from rotating relative to the guiding mast. The device furthermore comprises winding means for storing supply lines which are introduced at the top into the guiding mast and the gripper body.

Heretofore, devices of the above mentioned type have been so designed that the lifting mechanism comprising two cable winding drums and driving units is mounted on a second platform, and that the winch cables are by the drums by means of deviating rollers introduced from above into the mast and are connected to the gripping body through a compensating rocker arm. For purposes of actuating the gripper tools provided at the lower end of the gripper body, compressed air is employed which is introduced through for instance four hoses from above. The hoses are wound onto hose drums which are likewise arranged on the platform carrying the lifting mechanism or on additional platforms. The hoses are from the hose drums conveyed over deviating rollers into the guiding mast and to the gripper body. In a similar manner, outside the guiding mast a cable drum is arranged on a platform from which cable drum a cable is passed over a deviating roller into the guiding mast and to the gripping body. This last mentioned cable serves for conveying signals from the interior of the gripper body to the operator's stand on the working platform for purposes of indicating certain locking and unlocking positions of coupling elements. The hose drums and the cable drum are under the influence of springs which continuously urge the drum to turn in the direction of winding up the hoses or cables.

This construction has the drawback that during the rotation of the guiding mast, the winch cables, the hoses, and the cable are twisted with the result that jamming or wear or even breakage occurs.

A further drawback of this known construction consists in that the water which is carried or taken along by the winch cables, the hoses and the cable when being pulled up from the reactor tank, passes from the guiding mast to the drums and will drip off therefrom. Inasmuch as such water is contaminated, care has to be taken that it will be caught and made harmless. This requires quite a number of elements. Furthermore, care has to be taken that possible lubricating oil which escapes from the bearings of the winch drums and of the driving units as well as from the drums for the hoses and the cable is carefully caught so that it will not pass into the reactor tank. Furthermore, difficulties have to be expected because those parts of the hoses which are wound onto the hose drums have to be connected with the hoses connected within the region of the drum axes, and more specifically this connection has to be effected by couplings with coupling sections which are rotatable relative to each other and which may become defective so as to leak. Also contact difficulties at the collector rings of the cable drum have to be put up with.

Furthermore, the above outlined heretofore known design has the drawback that the platform with the cable winches, the hose drums and the cable drum require considerable space and that the arrangement of these machine elements of high platforms requires a high position of the center of gravity of the carriage which carries the working platform. This makes itself felt in a disadvantageous manner when starting and braking the carriage as well as during buffer shocks, and in case of an earthquake may be very dangerous. Therefore, complicated building steps have to be taken.

It is, therefore, an object of the present invention to provide a device of the above mentioned general type which will overcome the above mentioned drawbacks.

These and other objects and advantages of the invention will appear clearly from the following specification in connection with the accompanying drawings, in which.

The device according to the present invention is characterized primarily in that the lifting mechanism and the winding devices are mounted on the guiding mast for turning in common therewith.

Figure 1:
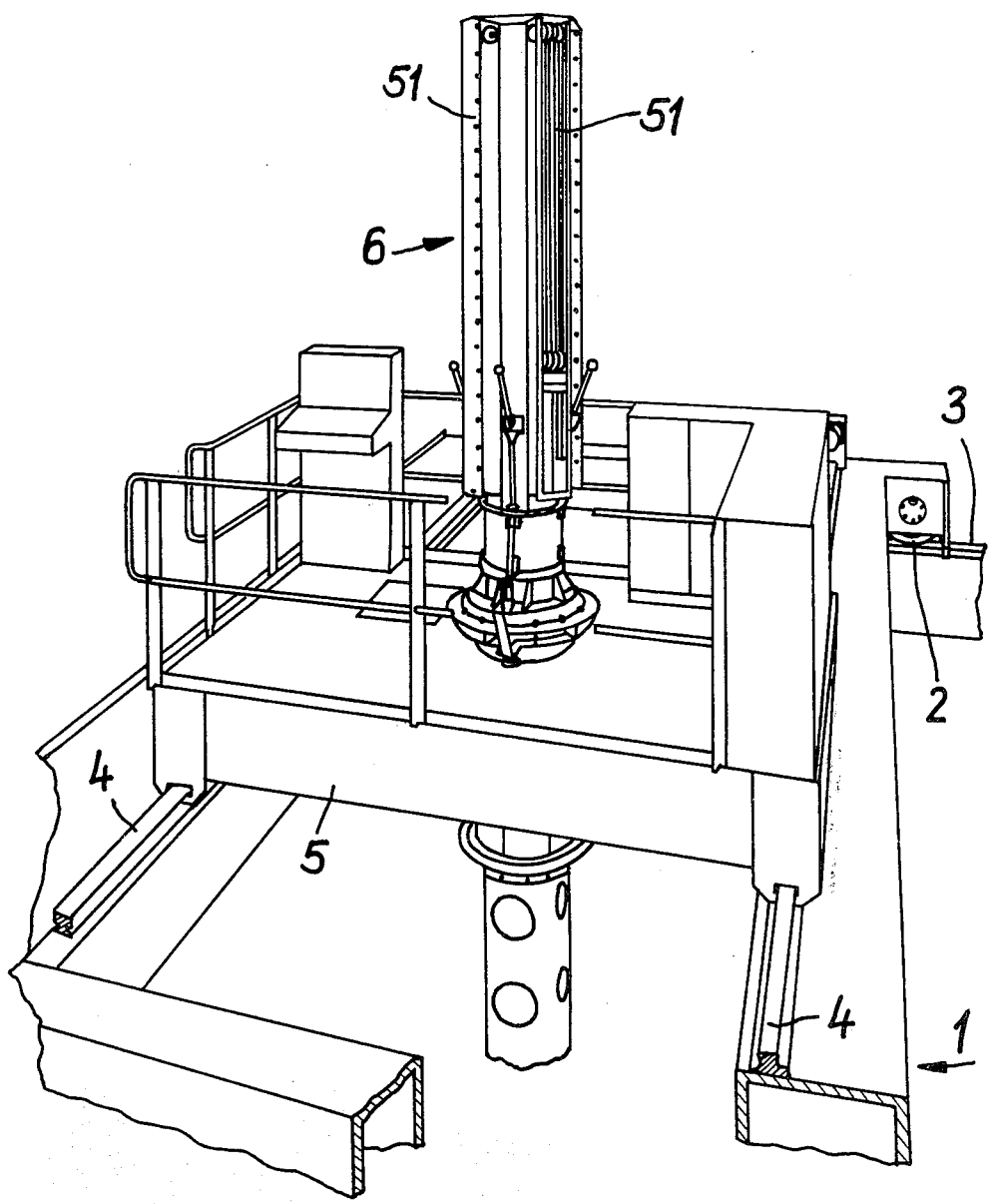
FIG. 1 shows a perspective view of the device according to the present invention.

Referring now to the drawings in detail, the device for varying the location of fuel elements and control rods is in conformity with FIG. 1 designed as travelling crane. The lower carriage of this crane has a frame 1 which at both ends is able by means of wheels 2 to move on rails 3 above the core of the core reactor and above an adjacent supporting and depositing tank or vessel. The frame 1 is provided with rails 4 which extend at a right angle to the rails 3. The working platform 5 in the form of an upper carriage is displaceable on said rails 4. The guiding mast 6 extends through an opening in the center of the working platform 5 with considerable play. The working mast 6 extends below the working platform 5 far downwardly and has a square shaped cross section. A section 7 of the guiding mast protrudes from the opening of the working platform upon the latter and rests on said working platform as shown diagrammatically in FIG. 2 and with structural details in FIG. 4. More specifically, the section 7 of the guiding mast rests on said working platform by means of a ring 8 on a ball turntable 9 with a vertical axis of rotation 10 which coincides with the central line of the guiding mast. The ball turntable 9 rests on a ring 11 which in its turn rests on the working platform 5 by means of three spindles 12 adjustable as to height.

Figure 5:
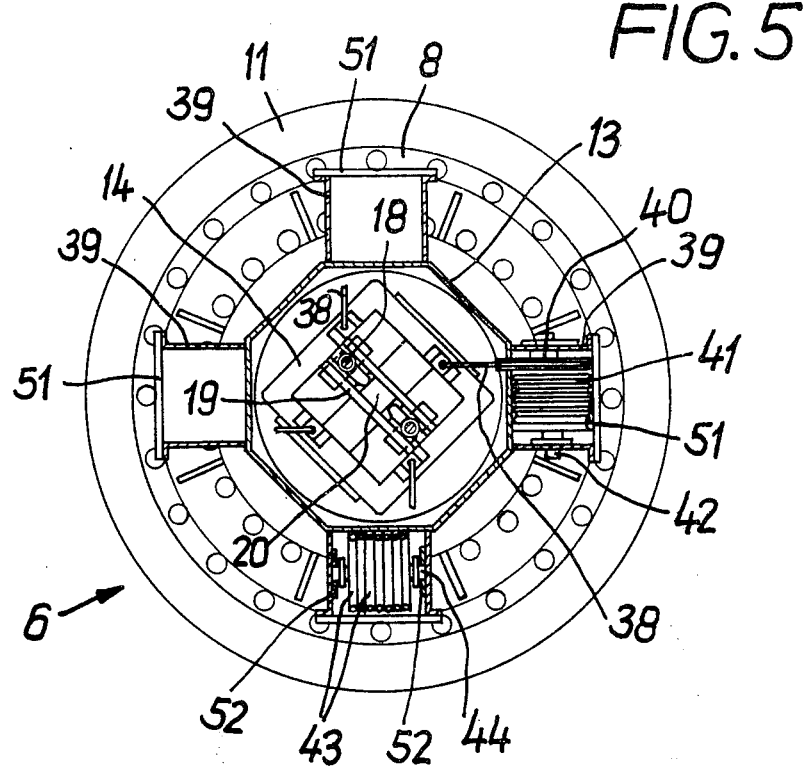
FIG. 5 represents a section taken along the line V—V of FIG. 4.

Mounted on the section 7 of thee guiding mast is an extension member 13 of the guiding mast which extension member has an octagonal cross section as shown in FIG. 5. This extension member 13 supports the lifting mechanism for the gripper body 14 which has a square shaped cross section and with considerable play is within the guiding mast displaceably guided in vertical direction. The guiding is effected by means of rollers 15 which with edges of the gripper bodies located diagonally opposite each other engage prismatic surfaces.

Figure 2:
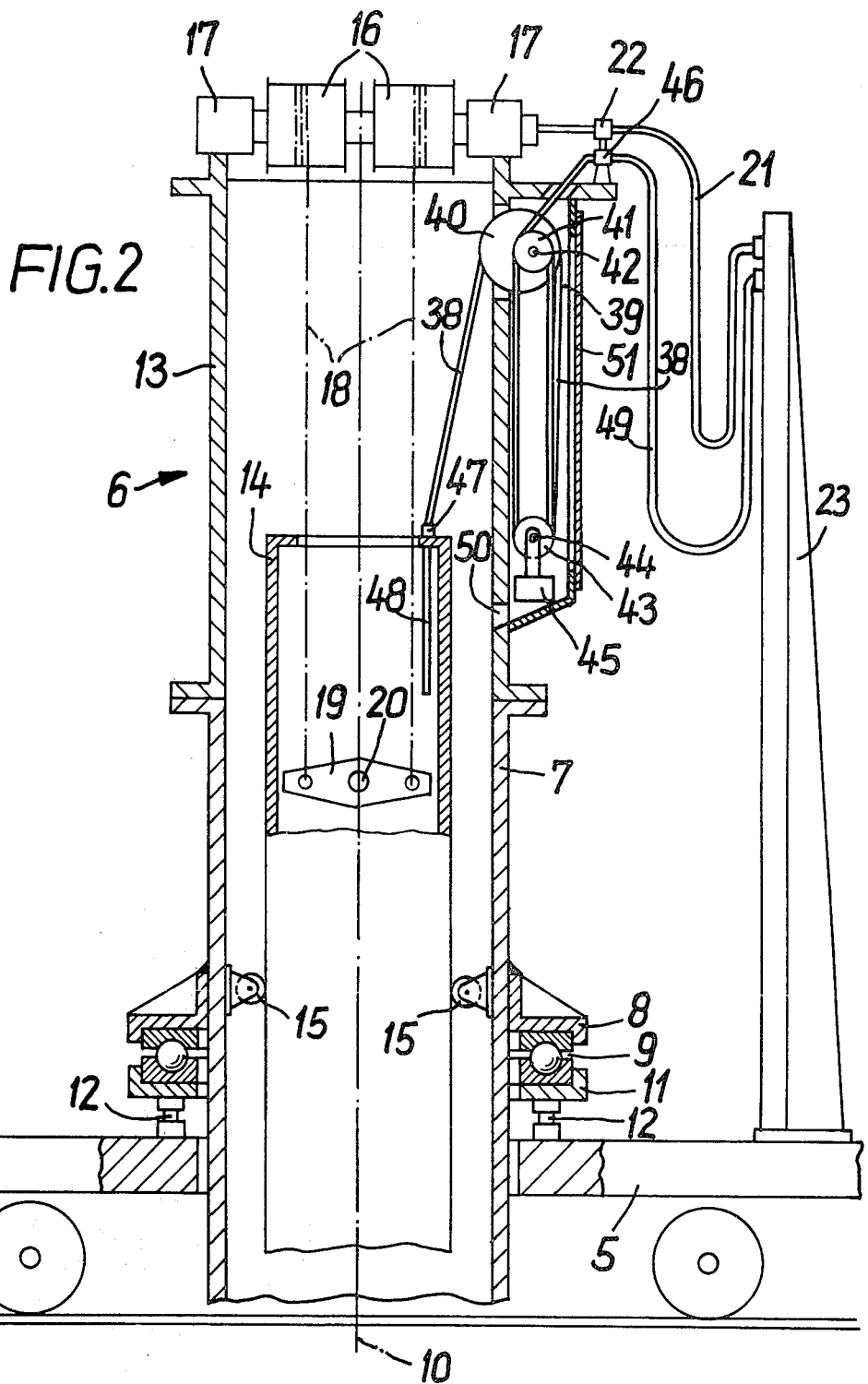
FIG. 2 illustrates an axial section through a device according to the invention, said section being taken through the guiding mast and in part through the gripper body.

With the embodiment of FIG. 2, the lifting mechanism comprises two cable winches with two drums 16 and furthermore comprises two pertaining driving units 17. This lifting mechanism is mounted on the upper end of the extension member 13. The winch-cables 18 extend from the drums 16 downwardly through an opening at the upper end of the hollow cable body 14. The winch cables 18 are connected to the ends of a two-arm lever 19 which by means of a joint bolt 20 is mounted on the cable body 14. When the driving units 17 have electric motors, they receive their current through a cable 21 which on one hand is connected to a holder 22 on the upper rim of the extension member 13 and on the other hand is connected to a column 23 mounted on the working platform 5. Between the two connecting areas, the cable 21 forms a loop which makes it possible that the guiding mast 6 together with the lifting mechanism 16, 17 can be turned by 360° in both directions, without the cable being tensioned taut. When the drums 16 are driven hydraulically, pressure fluid is conveyed to the hydraulic motors of the driving units 17 through hoses and is conveyed away by the latter, said hoses being in the same manner as the cable 21 connected to the holder 22 and to the column 23 while forming loops.

Figure 3:
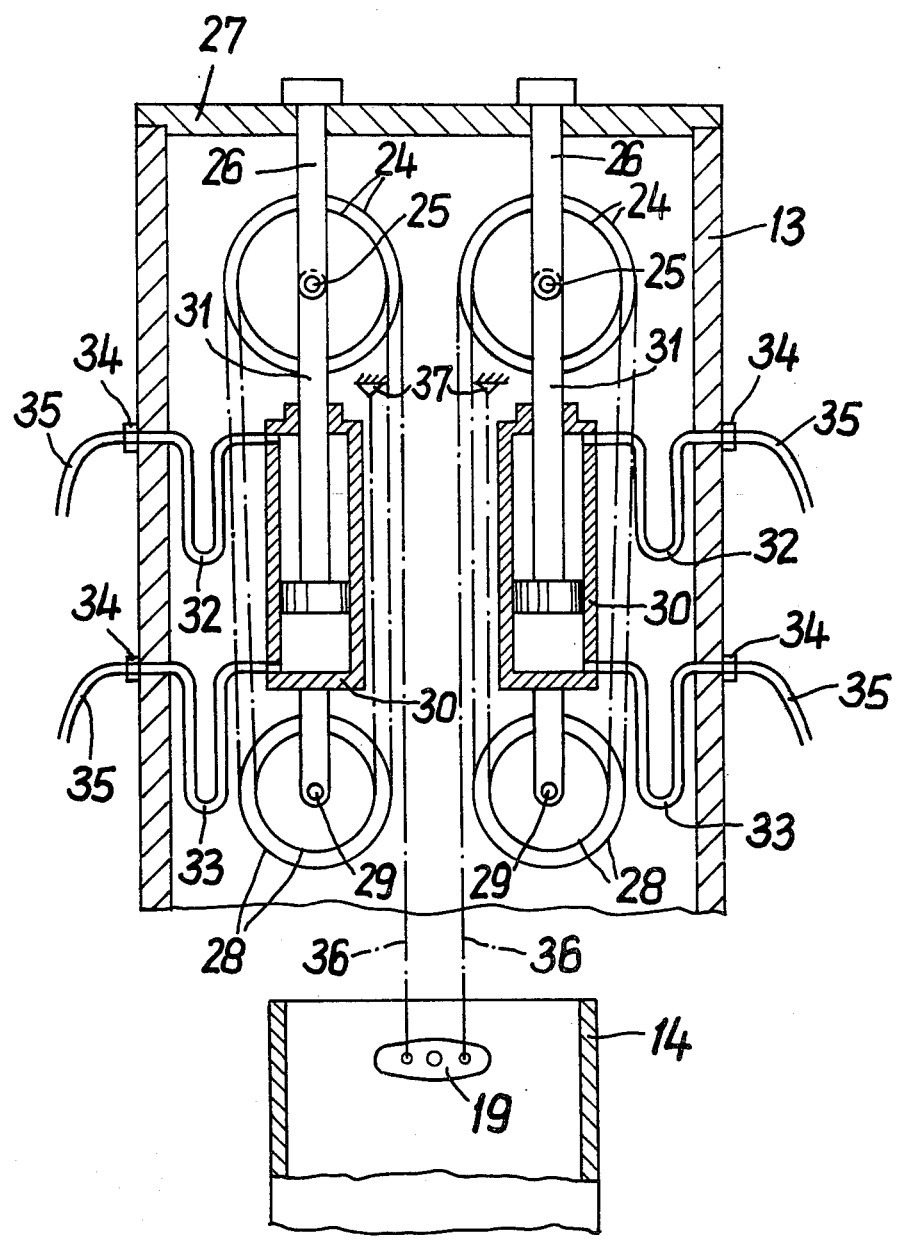
FIG. 3 represents a modification of the design of FIG. 2 and shows an axial section through the upper parts of the guiding mast and the gripper body.

According to FIG. 3, the lifting mechanism is not formed by cable winches but by two block and tackle systems. Each of the block and tackle systems comprises a group of upper rollers 24 the common axle of which is by means of a suspension mechanism 25 suspended on a plate 26 which closes off the extension member 13 of the guiding mast 6 at the upper end. Each of the block and tackle mechanisms furthermore comprises a group of lower rollers 28 the common axle 29 of which is suspended on a cylinder 30 of a double-acting hydraulic power system. The pertaining piston rod 31 extends through a stuffing bushing in upward direction from the cylinder 30 and is mounted on the axle 25. At the upper and lower end, pressure fluid conveying conduits 32, 33 lead into the cylinder 30. These conduits 32, 33 pass through the wall of an extension member 13 and through nipples 34 are connected to conduits 35. The conduits 35 while forming a loop are connected to a column 23 for effecting the supply and withdrawal of pressure fluid to or from a pressure fluid source. The said loop formation permits an easy turning of the guiding mast 6 in both directions by 360°. Between the cylinder 30 and the wall of the extension member 13, the pressure fluid conveying means 32, 33 form loops which permit movements of the cylinder 30 in upward and downward direction.

Cables 36 pass over the upper and lower rollers 24, 28 of the two block and tackle mechanisms respectively. These cables 36 start at connecting areas 37 and are connected to the ends of the two-arm lever 19 mounted in the grab body 14. When pressure fluid is introduced into the cylinder chambers 30 below the pistons through conduits 33, and if simultaneously pressure is discharged through conduits 32 from the cylinder chambers above the pistons, the axles 29 are moved downwardly. Consequently, the ends of the cables 36 which are connected to the lever 19 are pulled upwardly. The stroke of the grab body 14 amounts to a multiple of the distance by which the cylinders 30 are moved in downward direction. The transmission ratio of both movements equals the number of the cable strands guided in each block and tackle mechanism between the upper and lower rollers.

For purposes of lowering the grap body 14, the pressure fluid is through conduits 33 discharged from the cylinder chambers below the piston, while fluid under pressure enters the upper cylinder chambers.

When designing the lifting mechanism according to FIG. 2 as well as according to FIG. 3, it will be assured that any possible water which is carried along in upward direction from the settling tank by cables 18, 36 will when dripping down safely drop downwardly within the guiding mast 6 without the necessity of providing awkward collecting devices. Furthermore, the cables 18, 36 are not twisted during the rotation of the guiding mast 6. The hydraulic power operable devices 30, 31 according to FIG. 3 are expediently operated by water, so that if leakage occurs in the stuffing bushings, only non-harmful water but not oil will escape which latter would be harmful if it drops into the fluid of the settling tank. While it is possible instead of the hydraulic power operable devices to employ threaded spindles with nuts for moving the lower reversing rollers 28, 29, it should be appreciated that in this connection inadequacies could occur in view of the lubrication of the thread. The block and tackle systems can as building units easily be pulled out upwardly from the guiding mast.

For purposes of feeding the pneumatic adjusting devices for the grab tools, it is necessary to introduce compressed air into the grab body 14. This is effected by means of hoses which have to follow the movements of the grab body in upward and downward direction. FIG. 2 shows the arrangement of such a hose which is designated with the reference numeral 38. Such hose is as shown in FIG. 2 in its uppermost position provided to a major extent in a block and tackle mechanism which is located in a housing 39 on the outside of the extension member 13 of the guiding mast. The block and tackle mechanism has an upper deviating roller 40 which is so mounted that it extends through an opening in the wall of the extension member 13. Furthermore, eccentrically with regard to the roller 40, smaller upper reversing rollers 41 are mounted on an axle 42 in the housing 39. A group of lower reversing rollers 43 is with a common axle 44 movably guided within housing 39 in vertical direction. A weight 45 is suspended on the axle 44. The hose 38 is introduced by a holder 46 on the upper rim of the extension member 13 through an opening into the interior of the housing 39 and is here over a plurality of rollers passed over the upper and lower reversing rollers 41, 43 and finally over the large reversing roller 40 and from the latter downwardly to a connecting place 47 on the grab body 14. To this point there is connected a hose 48 which is guided downwardly in the interior of the grab body 14. Connected to the holder 46 is a hose 49 which communicates with the hose 38. On the other hand, the hose 49 is connected to the column 23 where the hose is connected to a feeding line coming from a source of pressure fluid for instance air under pressure. With the illustrated setting of the guiding mast, a hose 49 forms a loop so that the hose 49 when turning the guiding mast in both directions by 360° will not be tensioned taut.

When the grab body 14, as illustrated occupies its uppermost position, the lower deviating or reversing rollers 43 are by the weight 45 pulled into the lowermost position. Accordingly in the block and tackle mechanism, the major portion of the hose 38 is stored. When the grab body 14 is lowered, it pulls the hose 38 out of the block and tackle mechanism a corresponding length while the lower rollers 43 with the weight body 45 are lifted. By this arrangement, during the turning of the guiding mast 6, the hose 38 will be prevented from being twisted. When water, due to lifting the grab body 14, is through the hose 38 carried upwardly from the settling tank and passes into the housing 39, it drops off, and flows from the inclined bottom of the housing 39 through an opening 50 into the wall of the extension member 13 and into the interior thereof. Therefore, no expensive collecting devices are required in order to prevent the contaminated water from passing onto the working platform 5.

The housing 39 is on its outside provided with an opening which is covered up by a transparent plate 51 for instance of glass so that the movements of the hose 38 in the block and tackle mechanism can be observed from the outside.

The hose 38 is always by the same force exerted by the weight body 45 tightened or tensioned. On the other hand, however, when employing a drum for storing the hose, the pulling force which during the lowering of the cable body 14 would act upon the hose would increase to the extent to which the hose would be wound off from the drum. The drum is continuously urged by a spring to turn in winding-off direction so that the hose would be unfavorably stressed and the required precise load measuring would not be possible.

Figure 4:
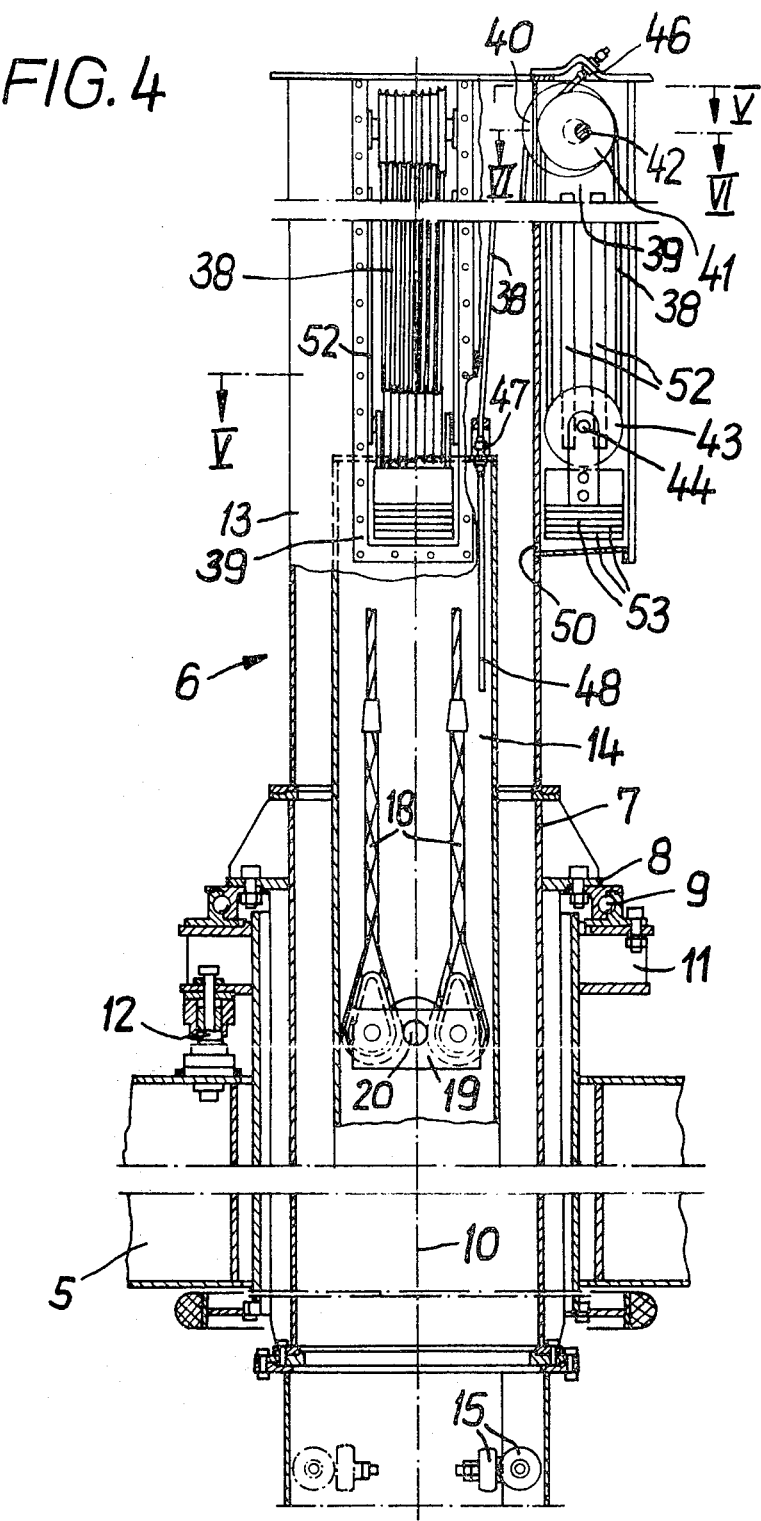
FIG. 4 shows a portion of the working platform and also shows an axial section through the upper portion of the guiding mast.

FIGS. 4 and 5 show that a total of four compressed air hoses 38 can be stored in four block and tackle mechanisms. The pertaining housings 39 are at four surfaces of an extension member 13 having hexagonal cross section uniformly distributed over the circumference of said extension member 13. FIGS. 4 and 5 further show the guiding of the axle 44 of the lower reversing rollers 43. To this end, pairs of flat irons 52 arranged in spaced relationship to each other are connected to the side walls of the housing 39. The axles 44 engage the space between said flat irons 52. Instead of a weight 45, as shown in FIG. 4, a plurality of weight discs 51 are suspended on each axle 44. The tensioning force in the hoses 38 may be increased and decreased by hanging more or less weight discs 53 onto the axles 44.

Figure 6:
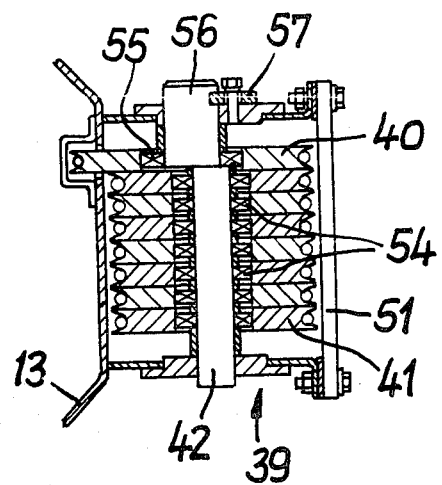
FIG. 6 is a section taken along the lines VI—VI of FIG. 4 but on a larger scale than that of FIG. 4.

FIG. 6 shows the mounting of the upper reversing rollers 41 on the axle 42 by means of antifriction bearings 54. The greater reversing roller 40 is by means of an antifriction bearing 54 journalled on a pivot 56 which is eccentrically arranged with regard to the axle 42 and is firmly connected to the latter and has a greater diameter than said axle 42. The pivots 56 and the axle 42 are secured against turning by means of a flat iron 52 engaging a groove of the pivot 56.

In the same manner as the compressed air hoses 38, a cable may be stored in a corresponding block and tackle mechanism by means of which cable by limit keys in the interior of the grab body, signals indicating the respective adjustment of coupling deviced are conveyed to the operator's stand on the working platform 5.

As will be evident from the above, the present invention brings about the advance that the danger of twisting of winch cables, hoses and cables will be avoided and that no expensive arrangements for collecting contaminated drip water and lubricating oil will be required. This is realized by a considerably simplified construction. In particular, generalaly a platform above the working platform will not be required, and a relatively low position of the center of gravity of the carriage supporting the working platform will be realized.

It is, of course, to be understood, that the present invention is, by no means, limited to the specific showing in the drawings, but also comprises any modifications within the scope of the appended claims.

What is claimed is:

1. Apparatus for relocating fuel elements and control rods in a core reactor in which a tubular mast is rotatable on a vertical axis on a horizontally movable platform and is provided with a gripper body, said apparatus including means nonrotatably but reciprocably guiding said gripper body for vertical movement in said mast, lift cable means connected to the gripper body and flexible conduit means also connected to the gripper body, drive means for the cable means and storage means for the conduit means said drive means and storage means being carried by said mast and rotating with the mast when the mast rotates about said axis.

2. An apparatus according to claim 1 in which said driving means and storage means are confined within the radial limits of the mast whereby water dripping therefrom will flow down the inside of the mast.

3. An apparatus according to claim 1 in which said drive means includes block and tackle means with pulley portions movable relatively in the vertical direction to take up and pay out cable means, and power operable means connected to said pulley portions for controlling said relative movement.

4. An apparatus according to claim 3 which includes a plurality of said block and tackle means and a respective cable for each thereof, said mast including compartment means above said platform in which said block and tackle means are disposed, the lower pulley portion of each block and tackle means being vertically movable and the upper pulley portion of each block and tackle means being stationarily supported by the mast.

5. An apparatus according to claim 3 in which said power operable means includes water operated piston and cylinder means.

6. An apparatus according to claim 1 in which said storage means includes upper roller means supported in said mast and lower roller means vertically movable in said mast and urged downwardly, said conduit means having an end connected to the gripper body and an end connected to the mast and entrained about said roller means between said ends.

7. An apparatus according to claim 6 which includes weight means detachably connected to the lower roller means for urging the lower roller means downwardly.

8. An apparatus according to claim 6 which includes housing means on said mast above said platform in which said upper and lower roller means are disposed, and means for guiding water which drips from said roller means to the inside of the mast.

9. An apparatus according to claim 8 which includes window means forming the outwardly facing side of said housing means.

10. An apparatus according to claim 6 in which each roller means comprises a plurality of rollers and the roller of the upper roller means from which the respective conduit leads to the gripper body is larger in diameter than the other rollers of the respective roller means and is offset therefrom toward the central axis of the mast so as to extend into the inside of the mast.

11. An apparatus according to claim 1 which includes power conduits leading to said drive means and having a point fastened to said mast, said conduit means also having a point fastened to said mast, said power conduits and conduit means also having a point fastened to said platform, and slack loops in said power conduits and conduit means between the said points of fastening thereof, said loops providing sufficient slack to permit 360° rotation of the mast on the platform.

* * * * *